United States Patent [19]

Janczak et al.

[11] Patent Number: 5,118,416

[45] Date of Patent: * Jun. 2, 1992

[54] PERMANENT MAGNETIC POWER CELL CIRCUIT FOR TREATING FLUIDS TO CONTROL IRON PIPES

[75] Inventors: Andrew Janczak, Massapequa, N.Y.; Edward Krensel, Philadelphia, Pa.

[73] Assignee: Enecon Corporation, Massapequa, N.Y.

[ * ] Notice: The portion of the term of this patent subsequent to Aug. 6, 2008 has been disclaimed.

[21] Appl. No.: 738,612

[22] Filed: Jul. 31, 1991

Related U.S. Application Data

[63] Continuation-in-part of Ser. No. 533,347, Jun. 5, 1990, Pat. No. 5,037,546.

[51] Int. Cl.$^5$ .............................................. C02F 1/48
[52] U.S. Cl. ...................................... 210/222; 210/695
[58] Field of Search ................... 210/222, 695; 55/100; 335/306

[56] References Cited

U.S. PATENT DOCUMENTS

| | | | |
|---|---|---|---|
| 4,747,874 | 5/1988 | Ghandehari | 75/254 |
| 4,873,504 | 10/1989 | Blume, Jr. et al. | 264/108 |
| 5,037,546 | 8/1991 | Janczak et al. | 210/695 |
| 5,055,189 | 10/1991 | Ito | 210/222 |

Primary Examiner—Robert A. Dawson
Assistant Examiner—Matthew O. Savage
Attorney, Agent, or Firm—Laurence R. Brown

[57] ABSTRACT

For better efficiency in removing scale and deposits in pipes, a high gauss permanent magnet unit, requiring no servicing or external power, mounts on the exterior surface of the pipes for establishing a flux path encompassing a greater portion of the flow path than heretofore feasible. Even more effectiveness results from mounting units in diametrically opposed pairs. The units have a pair of Alnico 8 magnetic plates held in an array to straddle an arc on the pipe surface to focus the magnetic flux into a prefered pattern into the fluid flow path. By blending a diverse permanent magnetic circuit path from a neodymium iron boron magnet, a multipole, multi-axial magnetic flux generator uniquely distributes and concentrates enough magnetic force for more effectively penetrating and treating fluid flow within iron walled pipes. These units can change hard calcite scale within pipes in the presence of fluid flow into soft aragonite/vaterrite crystals which are easily cleaned by flushing with liquid to dissolve existing scale, and also effectively prevent new scale formation on pipe walls.

3 Claims, 2 Drawing Sheets

PERMANENT MAGNETIC POWER CELL CIRCUIT FOR TREATING FLUIDS TO CONTROL IRON PIPES

This is a continuation-in-part of my co-pending application Ser. No. 07/533,347 filed Jun. 5, 1990, now U.S. Pat. No. 5,037,546.

TECHNICAL FIELD

This invention relates to the control of scale and corrosion in fluid flow pipes of iron or steel by means of magnetic fields and more particularly it relates to permanent magnet units mountable outside an iron pipe for penetrating through the iron pipe to produce unexpectedly greater magnetic flux in the fluid flow path within the pipe for treatment of scale and corrosion.

BACKGROUND ART

The role of magnetic flux in preventing scale on pipes has long been known, as evidenced by U.S. Pat. No. 438,579 dated Oct. 14, 1890, A. Faunce et al. Electromagnets for such purposes are represented by U.S. Pat. No. 531,183, Dec. 18, 1894, J. Harris; U.S. Pat. No. 2,652,925, Sep. 22, 1953, T. Vermeiren; and U.S. Pat. No. 4,151,090, Apr. 24, 1979 M. Brigante. Such systems are difficult to install and maintain, requiring electrical current connections and crating magnetic disturbances to sensitive electronic equipment in the vicinity.

Thus, permanent magnet configurations have been introduced such as set forth in U.S. Pat. No. 3,228,878, Jan. 11, 1966, D. Moody; and U.S. Pat. No. 4,367,143, Jan. 4, 1983, R. Carpenter. In these devices, longitudinally oriented magnets have a flux passing between north and south poles in narrow slice like flux paths that encompass only small portions of the cross section area inside the pipe, so that only portions of the passing fluid are subjected to the magnetic flux.

U.S. Pat. No. 4,605,498, Aug. 12, 1986, P. Kulish provides a magnet array encircling the pipe circumference and magnetized to present opposite poles radially from the outer pipe circumference to outer magnet circumference. This construction is quite ineffective and introduces significant problem in adaption to pipes already installed or those with limited accessibility. For example, a different model of magnet must be custom built for close fit for close fit with every different pipe size. With large pipe sizes of six inches (15 cm) or more in diameter such magnets are impractical, very large and very expensive. Furthermore, heavy flux concentrations necessary for proper fluid treatment are not feasible with this construction. The major flux path between north and south poles is thus directed in air outside the pipe and is ineffective in establishing a concentrated working flux within the fluid.

However, a significant problem occurs in converting flow within iron or steel pipes because magnetic fields tend to be shunted by the pipe walls before reaching the fluid flow region.

Accordingly, it is an objective of this invention to improve the art of permanent magnetic flux scale and corrosion control devices by introduction of magnetic structure able to penetrate the walls of iron and steel pipe and effectively treat fluid flow within the pipes.

DISCLOSURE OF THE INVENTION

The parent application provides universal type permanent magnetic flux scale control units adaptable to different pipe sizes, which may be retrofit at available pipe locations, even in cramped quarters. They provide improved high flux concentration within a larger working space area than feasible with prior art units, by means of separated pole pairs in each unit of very high gauss alnico permanent magnets. Thus, in essence the flux is focussed over a sectorial pattern of flux distribution within the pipe so that a ring of units about the pipe will assure almost complete coverage of the cross section area of fluid flow within the pipe with a high density magnetic flux field.

Long life and adaptability to conditions where vibration and shock are present is improved by means of two shunt permanent magnetic paths acting in unison. Thus, an auxiliary path of neodymium iron boron permanent magnet material serves as a reservoir for the high gauss alnico flux field to prevent its discharge in the presence of sporadic vibration or shock, and an assurance of an acceptably high maintenance flux over a long life period. In such units used on iron pipes, only about 10% of available magnetic flux is able to penetrate into the fluid flow region, thus decreasing effectiveness and use in copper, stainless steel, or plastic pipes, etc.

By employment of neodymium iron boron magnets rather than ceramic ferrite magnets, particularly when employing Alnico 8 (tradename) companion magnets, it has been found that flux within iron pipes is increased substantially by an order of magnitude.

BRIEF DESCRIPTION OF THE DRAWINGS

Like reference characters are used to identify similar features for facilitating comparison throughout the several views of the drawing, in which.

THE PREFERRED EMBODIMENT

Figure 1:
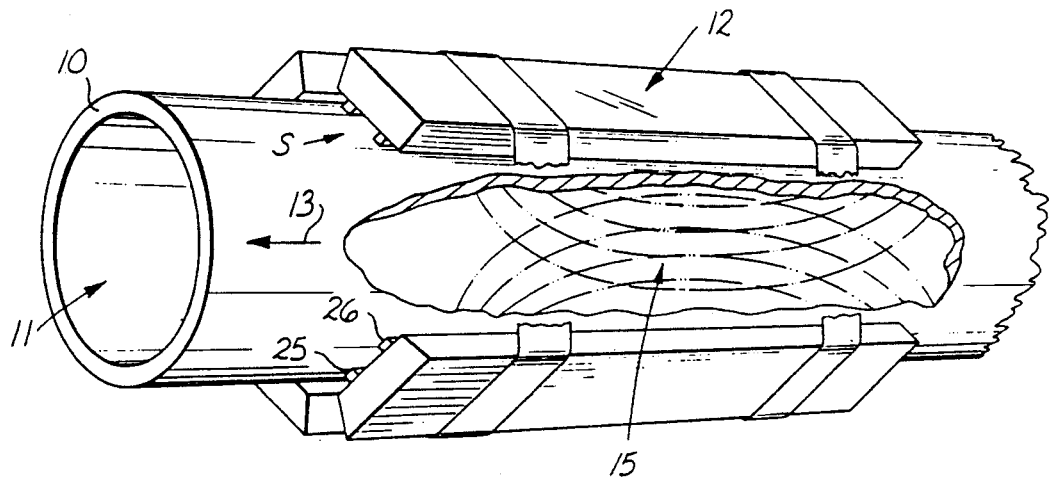
FIG. 1 is a perspective fragmental view, partly broken away, of a corroded pipe scale control embodiment illustrating the operation of the invention.

As maybe seen from FIG. 1, the pipe 10 has a fluid flow therein in the direction of arrow 13, which has resulted in deposits 11 of scale, etc. For removal and prevention of such scale, a plurality of corrosion treatment magnetic units 12 are arranged about the outer circumference of the pipe 10 for generation of a magnetic flux pattern 15 in the fluid flow path, which serves as means for controlling scale and corrosion. Each unit 12 is adapted to rest on the outer pipe circumference for creating a longitudinally oriented magnetic flux pattern 15 along a length of the fluid flow path. A ten inch (25 cm) diameter pipe such as depicted, then would have three pairs of diametrically opposed units mounted to substantially saturate the entire fluid flow cross section inside the pipe with magnetic flux.

Note that these single units of a single size have a wide range of adaptability to pipe sizes from one inch (2.5 cm) to very large diameters. Preferably an even number of units are arranged in diametrically opposed pairs with the individual units spaced equally apart on the outer circumference. A typical size for these units is about six inches (15 cm) long and about two inches (5 cm) wide. The south pole S is oriented downstream in the flow path 13.

Figure 2:
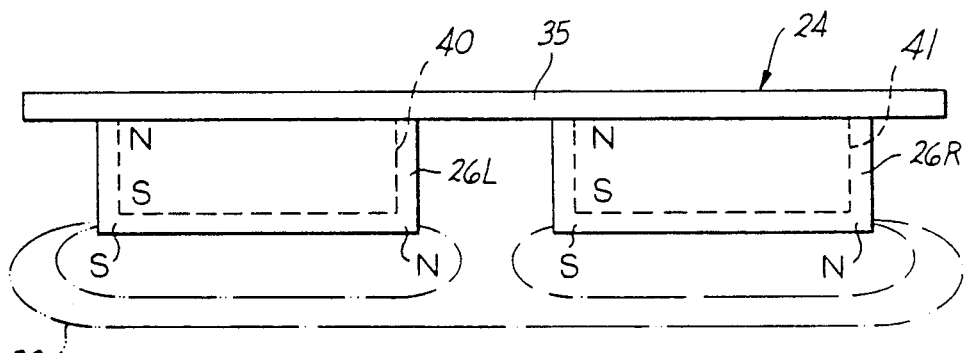
FIG. 2 is a side view of a double tiered flux treatment unit embodiment of the invention.
Figure 3:
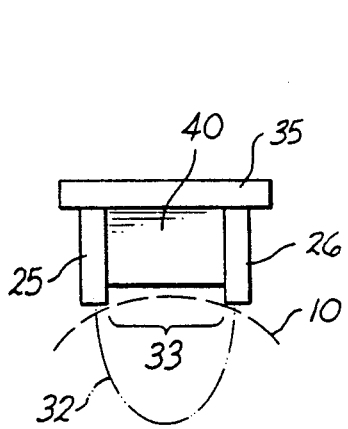
FIG. 3 an end view.
Figure 4:
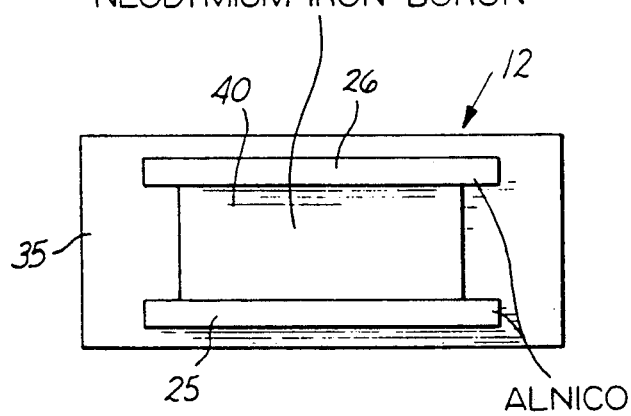
FIG. 4 a bottom view of a single unit.

As may be seen from FIGS. 2 to 4, the assembly may be a single unit 12 (FIG. 4) or a pair of longitudinally cascaded units 24 (FIG. 2). The latter dual unit is preferable whenever larger pipe diameters are involved (over 2") or any turbulence is possible in the flow path to assure that the fluid flows the full available length through a significant length of the available flux pattern for treatment.

The units 12 or assemblies 24 are made up of suitably packaged magnetic arrays having two spaced substantially rectangular Alnico 8 magnetic plates 25, 26 with a residual gauss in the order of 12,000 and with magnetic polarity from N to S positioned toward the flow path 13 and respectively extended as legs for contact with the outer circumference of pipe 10, straddling the arc 33 and serving to focus the very high gauss magnetic flux 30 in a rather sectorial pattern 32 encompassing a significant part of the cross section area of the fluid flow path within the pipe.

The low reluctance soft iron or equivalent non-permanent magnetic cover plate 35, which as seen from FIG. 4 spans both the alnico 8 and neodymium permanent magnets 25, 26, and 60 serves as a return path for the longitudinally oriented Alnico 8 magnet poles (N, S), at the side of the magnets 25, 26 remote from the pipe. Accordingly at the pipe side, the flux pattern (30, FIG. 2; 33, FIG. 3) is established for intrusion within the pipe 10.

Two substantially cubic neodymium iron boron permanent magnets 40, 41 with a residual gauss in the order of at least 10 million MGOe are normally disposed between the Alnico 8 magnets 25, 26 and with north poles (N) in contact with the low reluctance cover plate 35, to leave the adjacent Alnico 8 magnet legs for straddling the pipe 10 by extending from the bottom of the magnet, 40; 41, as shown in FIG. 3.

Figure 5:
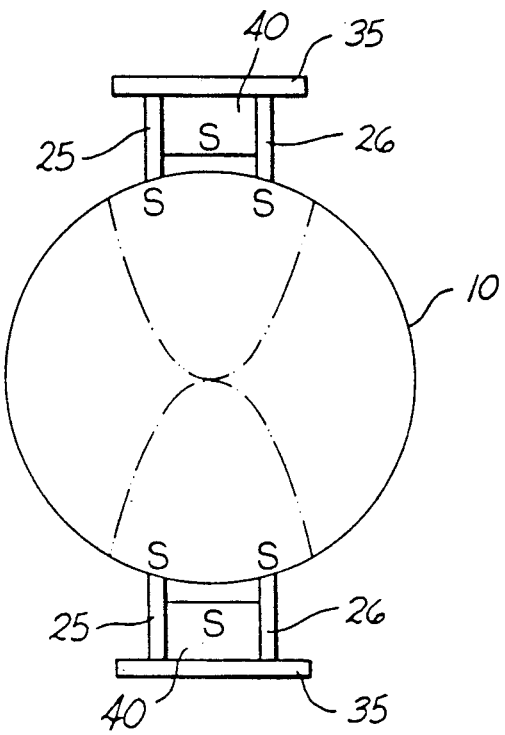
FIGS. 5 and 6 are respectively end view and side view section sketches of one pair of units diametrically opposed on opposite sides of a pipe illustrating typical flux patterns.
Figure 6:
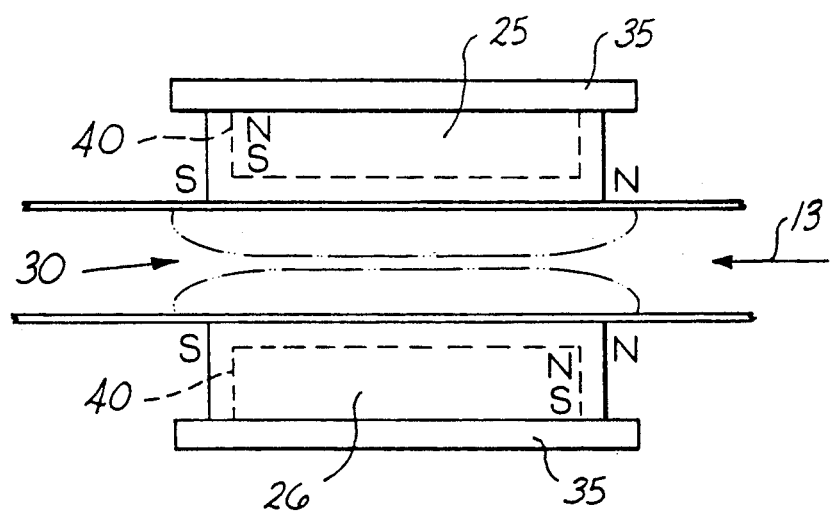

The cooperative relationship of the assemblies is better seen from FIGS. 5 and 6. In FIG. 5, the diametrically opposed preferable disposition of the two units is illustrated. Thus the repellant reaction of magnetic flux lines from the respective units near the center of the pipe 50 provides a better distribution of flux over a larger cross-section of the fluid flow path.

In FIG. 6, it is readily seen that the magnetic circuit 40, 35, 41 formed by the neodymium iron boron magnets 40 shunts the magnetic circuit formed by the Alnico 8 magnets 25, 26. This serves several purposes. For one thing, there is a preferred defined outer radial (as seen from the pipe) stray flux path defined to reduce external fields, and to concentrate any stray flux longitudinally oriented to the pipe from the alnico north and south poles to penetrate the fluid flow path.

This disclosed combination of magnetic elements provides considerable advantage in the task of controlling scale in a fluid flow path within an iron or steel pipe.

It has been established that the effective field operable on fluid flow within iron pipes with former ceramic ferrite magnet embodiments is only about ten percent as great as for plastic or copper pipes for example because of the magnetic shunting effect of the iron in the pipes. Thus, it has not heretofore been feasible to produce strong enough magnetic field strength in the fluid flowing within iron walled pipes with externally located magnetic cells. However, in accordance with this invention, effective magnetic fluid flow treatment of fluids within iron walled pipes is now feasible, even where the wall thickness is in the order of one half inch (1.3 cm).

With reference to FIG. 4, it is seen that the magnets 25 and 26 are of Alnico, and for critical use with iron walled pipes, Alnico 8 is highly preferred. Also it is seen that magnet 4 is a neodymium iron boron magnet.

For units particularly adapted to treat iron wall thicknesses up to one-quarter inch (0.65 cm) a polymer bonded neodymium iron boron magnet, which provides in the order of $10 \times 10^6$ MGOe, is found to effectively penetrate the iron walls with a flux strength that dissolves and prevents scale effectively.

For units better adapted for thicker walled iron pipe, such as one-half inch (1.3 cm) however, sintered neodymium iron boron magnets providing in the order of $27 \times 10^6$ MGOe are supplied.

These special iron pipe units are preferably supplied as double or triple cascaded units of the nature shown in FIG. 2.

Thus, for the first time effective fluid flow treatment within thick walled iron pipes is feasible; capable of changing hard calcite scale into soft aragonite/vaterrite crystals which can be easily cleaned and removed by flushing with the flowing liquid.

It is seen, therefore, that the novel magnetic units afforded by this invention provide higher magnetic flux concentrations capable of producing effective flux concentration for treating fluid flow within iron and steel pipe.

Having therefore advanced the state of the art, those novel features descriptive of the nature and spirit of the invention are set forth with particularity in the following claims.

We claim:

1. A dynamic magnetic fluid flow treatment unit for positioning on the exterior of an iron pipe to control scale and deposits within the iron pipe, comprising in combination a longitudinal axis parallel to a length of said iron pipe, a pair of parallel spaced apart alnico permanent magnet plate members with N and S magnetic poles disposed at opposite ends thereof for spanning the length of said iron pipe, the N and S magnetic poles of said alnico permanent magnet plate members being aligned in a direction parallel to said longitudinal axis, a neodymium iron boron permanent magnet positioned between the alnico plate members with N and S magnetic poles aligned in a direction substantially perpendicular to said longitudinal axis for alignment substantially perpendicular to a periphery of said iron pipe, a low reluctance soft-iron, non-permanent magnetic circuit shunting cover plate member disposed substantially parallel to said longitudinal axis and substantially in contact with all said magnets, means for positioning said cover plate member substantially parallel with said length of said iron pipe with the magnets positioned between the cover plate member and said length of iron pipe, said cover plate member thereby producing magnetic flux patterns extending away from the pair of alnico plate members, with said magnets having strengths of a magnitude sufficient to penetrate at least a one quarter inch (0.65 cm) thick iron pipe wall with a magnetic flux of sufficient magnitude to remove and prevent scale buildup within the pipe in the presence of a fluid containing ions flowing through the pipe.

2. The unit defined in claim 1 wherein said neodymium iron boron permanent magnet comprises a polymer bonded neodymium iron boron magnet producing a magnetic field in the order of 10 million MGOe.

3. The unit defined in claim 1 wherein said neodymium iron boron permanent magnet comprises a sintered neodymium iron boron magnet producing a magnetic field in excess of 20 million MGOe.

* * * * *

UNITED STATES PATENT AND TRADEMARK OFFICE
CERTIFICATE OF CORRECTION

PATENT NO. : 5,118,416
DATED : June 2, 1992
INVENTOR(S) : Andrew Janczak et al.

It is certified that error appears in the above-identified patent and that said Letters Patent is hereby corrected as shown below:

ON THE TITLE PAGE AND IN COLUMN ONE:
Change the title to read:

--- PERMANENT MAGNETIC POWER CELL CIRCUIT FOR TREATING FLUIDS TO CONTROL MINERAL SCALE AND SCALE-INDUCED CORROSION IN FLUID FLOW SYSTEMS WITHIN IRON PIPES ---.

Signed and Sealed this

Ninth Day of February, 1993

*Attest:*

STEPHEN G. KUNIN

*Attesting Officer*     Acting Commissioner of Patents and Trademarks